Patented Nov. 18, 1947

2,430,933

UNITED STATES PATENT OFFICE 2,430,933

THERMOSETTING ADHESIVES

Fred W. Hoover, Wilmington, Del., assignor to E. I. du Pont de Nemours & Company, Wilmington, Del., a corporation of Delaware No Drawing. Application April 6, 1944, Serial No. 529,839

9 Claims. (Cl. 20—89)

This invention relates to laminated products and more particularly to improvements in plywood and its manufacture.

A variety of materials have been proposed for use as adhesives in bonding different types of materials together. Some of these have been used commercially but they possess certain disadvantages. Some of the known adhesives are thermoplastic, for example linear vinyl polymers or synthetic linear polyamides, and if bonded structures containing this type of adhesive are exposed to temperatures above the softening point of the adhesive, the entire structure fails. Other adhesives are thermosetting and do not soften at elevated temperatures, but these have other disadvantages. Among these disadvantages may be mentioned (1) the adhesive solutions are relatively unstable and must be used within a few hours after they are made up, (2) relatively high curing temperatures are required to obtain satisfactory setting of the adhesive, (3) the amount of adhesive required to obtain satisfactory bond strength is rather critical, (4) when such adhesives are applied to wood, the wood must be conditioned to a certain critical moisture content in order to obtain maximum bond strength, and (5) the cured adhesive layer is quite brittle and when used in the manufacture of plywood it is not flexible enough to permit bending the plywood veneer around small radii of curvature without breakage. Other types of adhesives have satisfactory bond strength when dry but are water-sensitive and hence unsuitable for uses where the bonded materials are exposed to moisture.

The above mentioned defects in the previously used bonding materials are particularly serious in the manufacture of plywood. The presence of plastic flow in the initial bonding phase with the absence of plastic flow in the finished product is seldom obtained. These conditions are necessary for the successful formation of molded objects containing compound curves. Even in the case of the more satisfactory of the bonding materials heretofore used, for example, the phenolaldehyde type adhesives, the curing temperature required in the early stages of the heat treatment is too high for obtaining best economy in the manufacture of molded plywood. In addition the relatively high rate at which the adhesive sets prevents its complete uniform bonding between the individual plies, and prevents dissipation of stresses and strains throughout the molded structure which develop under molding conditions.

This invention has as an object the production of new and useful laminated products. A further object is the manufacture of new and valuable laminated articles in which at least one of the laminae is a polymeric organic material having a substantial number of hydrogens attached to elements from Group V and VI of the periodic table, particularly cellulosic or other hydroxyl-containing material. A further object is the production of a new and improved molded plywood product. Still further objects reside in methods for obtaining these articles and products. Other objects will appear hereinafter.

The above objects are accomplished in the manner more fully pointed out by bonding the laminae with the nitrogen substituted synthetic polyamides known as N-alkoxymethyl polyamides.

These N-alkoxymethyl polyamides contain as an integral part of the polymer chain groups of the formula

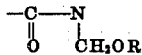

wherein R is the radical of an alcohol. These nitrogen substituted polyamides, in addition to other properties, differ from the unsubstituted polyamides in that they are thermo-setting and not thermo-plastic when subjected to curing conditions. They are prepared by treating a linear polyamide which has hydrogen-bearing carbon amide groups with formaldehyde and an alcohol in the presence of an oxygen-containing acid. The acid catalyst can be either an organic acid or a relatively weak inorganic acid, such as the acids of phosphorous, which have an ionization constant less than 2. The reaction can be carried out by heating at about 60° C. a solution of the initial polyamide, for example, polyhexamethylene adipamide, in solution in formic acid with a solution of paraformaldehyde in methanol, and isolating the product.

I have discovered that the N-alkoxymethyl polyamides are of peculiar utility as the bonding medium for laminating polymeric organic material having a substantial number of hydrogens which are attached to elements from Groups V and VI of the periodic table, for example, hydroxyl-containing materials such as wood, paper, or fibers and fabrics composed of cellulose or cellulose derivatives containing free hydroxyl groups. This is due, it is believed, to the ability of the N-alkoxymethyl polyamides to react chemically with the hydroxyl groups or other groups which contain active hydrogen of these materials to form exceptionally strong bonds between the different members of the laminated structure. The invention can be carried out by applying a solution of the N-alkoxymethyl polyamide in a suitable solvent preferably containing a small proportion, e. g., 0.5–1.0% (based on weight of polymer), of an acid catalyst to the contact surfaces of the laminae by any suitable means, for example, by brushing, spraying or by means of a glue spreader. A suitable amount of the N-alkoxymethyl solution is that sufficient to give 7–20 pounds of the solid polymer per 1000 square feet of glue line. The coated surfaces are allowed to dry under ordinary atmospheric conditions for at least 2 hours or until the solvent is substantially removed. The coated surfaces are then placed in contact and the entire assembly subjected to a pressure and temperature sufficient to shape the assembly into the desired form and to cause the bonding material to become infusible. In the case of plywood made from thin veneer, the plies are pressed at a pressure of 40–70 lbs./sq. in. and heated to a temperature of 110°–120° C. for a period of about 20 minutes. At the end of this treatment the bonded structure can be removed while still hot from the press or mold.

The invention is further illustrated by the following examples, in which the proportions of ingredients are expressed as parts by weight unless otherwise noted.

*Example I*

A solution is prepared by stirring 30 parts of N-methoxymethyl polyhexamethylene adipamide having 11.0% methoxyl and about 0.5% methylol groups, which correspond to an amide substitution of about 51%, with 70 parts of 70% aqueous ethyl alcohol (70 parts of ethyl alcohol to 30 parts of water) in a suitable container until a smooth solution is obtained. This solution has a viscosity of about 900 centipoises at 25° C. To this solution is added 1% (based on the weight of the methoxymethyl polyhexamethylene adipamide) maleic acid as a catalyst. After the catalyst is thoroughly mixed in the solution it is brushed on the contact surfaces of $\frac{1}{16}$" birch veneer at a rate of about 75 pounds of liquid per 1000 sq. ft. of glue line. The solution is allowed to dry at room temperature for at least two hours to enable most of the solvent to evaporate. The three plies are then placed together and pressed at a temperature of 120° C. at 55 lbs./sq. in. pressure for 30 minutes. After the pressure is released, the plywood is immediately removed from the press, and a non-thermoplastic bond obtained by this heat treatment. The resulting plywood, tested by the plywood shear test as described on page 71 of the United States Department of Agriculture Department Bulletin #1500, June 1929, has a dry shear strength of 775 lbs./sq. in. with 100% wood failure. The same plywood, after exposure to boiling water for 3 hours and testing while wet, has a shear strength of 559 lbs./sq. in. with 77% wood failure. The corresponding shear strengths obtained for plywood of similar construction bonded with commercial adhesives of the phenol-formaldehyde type are 400–500 lbs./sq. in. when tested dry and 350–360 lbs./sq. in. when tested after immersion in boiling water for 3 hours. In addition to possessing exceptionally high dry and wet shear strength, this birch plywood is exceptionally resistant to repeated exposure to water and dry heat. When subjected to ten cycles consisting of two hours in boiling water followed by drying for 22 hours at 60° C., it shows practically no deterioration, warping, or loss of strength.

*Example II*

The bonding solution is prepared by dissolving 35 parts of N-methoxymethyl polyhexamethylene adipamide of about 50% total amide substitution in 65 parts of 70% aqueous ethyl alcohol. To this solution is added 0.35 part of maleic acid and the entire solution thoroughly agitated. This solution is spread on the contact surfaces of three plies of $\frac{1}{16}$" birch veneer at the rate of about 30 pounds of liquid (10.5 pounds of solids) per 1000 sq. ft. of glue line. The coated wood is then allowed to dry at room temperature for at least two hours to remove volatile solvents. The dried plywood sheets are cut to fit the surface of a collapsible mold. The cut pieces are then wrapped around the collapsible core and stapled temporarily in place. The covered core is placed in a rubber bag which is evacuated. The atmospheric pressure on the outside of the bag presses the plies into place against each other and shapes them to the core. The entire assembly is then placed in an autoclave where steam at a pressure of about 30 lbs./sq. in. (120° C.) is introduced. At this point compressed air is introduced to bring the total pressure up to 55–70 lbs./sq. in. and the assembly left in the autoclave for a total period of about 30 minutes. The first ten minutes is required to bring the temperature of the plywood up to 120°, and it is kept at this temperature for the next 20 minutes to cure the adhesive. At the end of this heating period the pressure is released from the autoclave and the assembly removed immediately.

*Example III*

A film of N-methoxymethyl polyhexamethylene adipamide is prepared by spreading an alcohol solution of the polymer on a suitable support and allowing the solvent to evaporate. This film is then placed between the adjacent surfaces of strips of maple wood which are to be joined by a 1" lap joint and then pressed for one hour at 165° C. The resulting bond has a dry shear strength of 1100 lbs./sq. in.

*Example IV*

A solution of 20% concentration is prepared by dissolving 10 parts of an N-isobutoxymethyl polyhexamethylene adipamide of high substitution in 40 parts of a 70% aqueous alcohol solution. The resulting solution has a viscosity of 270 centipoises at 25° C. To this solution is added 1% (based on the weight of polyamide) of maleic acid, and after thorough mixing the solution is applied in two coats to the contact surfaces of three plies of $\frac{1}{16}$" birch veneer at the rate of about 18 pounds of solids per 1000 sq. ft. of glue line. The coated plies are allowed to dry at room temperature for about 16 hours to permit the solvent to evaporate. The three plies are then placed together and pressed at 120° C. and 50–70 lbs. sq. in. pressure for 20 minutes. After removal from the press and conditioning at atmospheric temperature for one day the resulting plywood is found to have a dry shear strength of 718 lbs./sq. in. with 58% wood failure. After immersion in boiling water for 3 hours it has a shear strength of 414 lbs./sq. in. with 66% wood failure.

As has been previously pointed out the present invention is of peculiar utility in the production of laminated articles in which one or more of the laminae is an active hydrogen containing material, particularly a hydroxyl-containing material since the N-alkoxymethyl polyamides actually reinforce such material by reason of the chemical action which takes place between it and the polymer. A particularly valuable embodiment of this invention, with regard to both the improved properties obtained in the product and to the practical advantages in manufacture, is the preparation of molded plywood. Referring to the preparation of this material in Example II it is to be noted that the comparatively low curing temperature (120° C.) in comparison with that required for a phenol-formaldehyde type of adhesive (140° C.) allows the rubber bags to be used a greater number of times, which is an important economic advantage. Also the rate of which N-alkoxymethyl polyamides set up is not as fast as that for the phenol-formaldehyde resins. This slower rate enables the adhesive to spread uniformly between the individual plies and thus produce perfectly uniform bonding throughout the molded structure. In addition, the initial plasticity of the adhesive is sufficient to dissipate any strains and stresses which may develop in the structure during the bonding operation, especially with curved structures. This is an important factor in obtaining the highest possible bond strength and avoids cracking and bridging of the plies in molded plywood, particularly in the preparation of curved structures. A further valuable advantage resides in the fact that the N-alkoxymethyl polyamides become infusible after curing, e. g., heating at an elevated temperature, suitably about 100° C. or above, and preferably in the presence of an acid catalyst. There is no plastic flow in the molded plywood after it is removed from the press. This lack of plastic flow under stress, even at temperatures as high as 180° F., enables molded articles having compound curves to be prepared by this process. An additional advantage in the preparation of plywood is that the moisture content of the wood is not critical and alternating wet and dry conditions can be tolerated.

Other examples of laminae which comprise hydroxyl containing material and which for the reasons previously given are of special utility in the practice of this invention are paper, cotton fabric, rayon, regenerated cellulose film, hydrolized vinyl ester polymers and interpolymers and cellulose acetate or other polymers in which there are present substantial numbers of hydrogens which are attached to oxygen, nitrogen and sulfur, such as in nylon, cellulose derivatives, polymeric thiol compounds, etc. In all of these, the active —OH, NH, and —SH groups probably enter into a chemical reaction with the N-alkoxymethyl polyamide. Although laminae consisting of materials not containing active hydrogen yield with the present polymer interlayer a weaker bond than is desired for the improved laminated wood products described herein, articles of utility can be obtained with laminae not containing active hydrogen. Examples of such laminae are glass, leather, mica, etc. Examples of two dissimilar materials which may be bonded with these adhesives are wood to metal, paper to wood, rubber to glass, rubber to leather, nylon to leather, glass to wood or metal, fabric to metal, and various other combinations of these and other materials. Because of their remarkable toughness, the N-alkoxymethyl polyamides are useful as inner layers for safety glass, in which sheets of glass or plastics are separated and reinforced by these N-alkoxymethyl polyamides.

The N-alkoxymethyl polyamide composition is also of utility in the bonding of small particles, such as cellulosic particles (flock), and abrasives, e. g., silica, carborundum and the like, to flexible or inflexible bases to which the composition adheres. The particles may be applied in any convenient manner, such as dusting on to a surface while the adhesive composition is tacky.

The N-alkoxymethyl polyamides mentioned in the examples can be replaced by any of the large number of the polymers of this kind obtainable by reacting various alcohols in the manner previously pointed out with different polyamides containing hydrogen-bearing amide groups obtained from reactants of the kind described in United States Patents 2,071,250, 2,071,253 and 2,130,948, namely, from monoaminomonocarboxylic acids, and mixtures, in equimolecular amount, of dibasic carboxylic acid with either a diamine or a monoaminomonohydric alcohol. The polyamide from which the N-alkoxymethyl polyamide is derived can, in addition to the hydrogen-bearing amide groups, contain non-hydrogen-bearing amide groups, as in the case of the polyamides obtained by reacting a mixture of diprimary and disecondary diamines, it being understood that these reactants can be replaced by their amide-forming derivatives. Although the N-alkoxymethyl polyamides derived from polyhexamethylene adipamide are particularly useful for the present purpose, the initial polyamide from which the N-alkoxymethyl polyamide is obtained can be that obtained from any of numerous other polyamide-forming reactants. One or more of such dibasic carboxylic acids as glutaric, pimelic, suberic, azelaic, sebacic, carbonic, 1,2-cyclohexanediacetic, paraphenylenediacetic, and diglycolic acids can, for example, be reacted with one or more of the following diamines: Ethylenediamine, tetramethylene diamine, octamethylene diamine, decamethylene diamine, p-xylylene diamine, triglycol diamine. Examples of suitable amino acid polyamides are those obtained from such primary monoaminocarboxylic acids as 6-aminocaproic, 12-aminostearic, and 4-aminocyclohexylcarboxylic acids. Interpolyamides are also valuable for making derivatives suitable for use in this invention. Typical are those which can be made from a mixture of the just cited polyamide-forming compositions, e. g., from a mixture of two diprimary diamines with one or more dibasic carboxylic acids. Other interpolymers are those obtained by reacting a polyamide-forming composition with another polymer-forming composition e. g., a polyester-forming composition.

The alkoxy groups in the N-alkoxymethyl polyamides can be derived from a variety of alcohols, for example, ethanol, propanol, butanol, cyclohexanol, furfuryl alcohol, methoxymethyl alcohol, beta-ethoxyethanol, octyl alcohol, lauryl alcohol, benzyl alcohol, unsaturated alcohols such as allyl alcohol and oleyl alcohol, alcohols containing additional functional groups such as methyl glycolate and ethanol formamide, di- and polyhydric alcohols such as ethylene glycol and glycerol, and ethyl chlorohydrin.

The N-alkoxymethyl polyamides used in the practice of this invention can vary somewhat widely in degree of substitution which for optimum results will depend on the specific alkoxy group in the polymer. With N-methoxymethyl polyhexamethylene adipamide, derivates in which more than about 30% of the amide groups are substituted are suitable for the present purpose. Derivatives of less than 30% substitution are less satisfactory because they have poorer solubility in common solvents and they give inferior water resistance in the bond. The preferred degrees of substitution are from 45 to about 55%. These substituted polyamides in this range in general have preferred solubility, stability of solution, and thermosetting properties. N-methoxymethyl polyhexamethylene adipamides of 30–45% substitution give satisfactory bonding but their solutions are relatively unstable, that is, they tend to gel rapidly at ordinary temperatures. N-methoxymethyl polyamides of more than 55% substitution can also be used, but they are harder to isolate from their reaction mixtures. With higher alkoxymethyl polyamides, somewhat lower degrees of substitution are satisfactory. For example, a N-ethoxymethyl polyhexamethylene adipamide having 36% of its amide groups substituted is just as effective in bonding action as a N-methoxymethyl polyhexamethylene adipamide of 50% substitution. However, N-ethoxymethyl polyhexamethylene adipamides of about 20–32% substitution form unstable solutions.

The N-alkoxymethyl polyamides as customarily prepared also contain some hydroxymethyl radicals on the amide groups. It is preferred that the proportion of hydroxymethyl groups be relatively small. For example, N-methoxymethyl polyamides containing a ratio of 7 methoxymethyl groups to one hydroxymethyl group have been found suitable in the practice of this invention but it is preferred that the ratio be of the order of 20:1. The amount of hydroxymethyl substitution of the amide nitrogen atoms is included in the values of total amide substitution mentioned in the preceding paragraph.

N-alkoxymethyl polyamides of both high and low viscosities give uniformly excellent bond strength in plywood. Therefore, any viscosity which gives a coating composition of suitable working characteristics when spread on the contact surfaces of the materials to be bonded is suitable.

The N-alkoxymethyl polyamide bonding material can be cured under a wide variety of conditions. The time and temperature of heat treatment depend on the presence or absence of a catalyst. The bond can be rendered insoluble and infusible by heating at temperatures of 140°–165° C. or higher temperatures below the decomposition point of the polymer for 20 minutes to 1 hour when no catalyst is used. However, the temperature of curing can be lowered, or the time shortened, by the use of catalysts. When suitable catalysts are used the adhesive can be cured at temperatures as low as ordinary room temperature. For example, N-methoxymethyl polyhexamethylene adipamide adhesive catalyzed with 1% of its weight of maleic acid is cured in 30 minutes at 100° C. or in 5 minutes at 143° C.; with 2% maleic acid the bond is cured in 3 weeks at room temperature (20° to 30° C.) and with 10% of this catalyst it is cured in 16 to 20 hours at 25° C. Likewise, a similar N-methoxymethyl polyhexamethylene adipamide adhesive catalyzed with 2% of its weight of p-toluene sulfonic acid is cured in 2 weeks at room temperature (25° to 30° C.) and the resulting bonds withstand exposure to boiling water for 3 hours.

The activation of the adhesive composition to bring about the curing of the composition may be carried out by the use of high frequency current according to the process described in Pitman, Reissue Patent 22,301.

Catalysts for the curing of the N-alkoxymethyl bonding material can be acids or acid-reacting salts. The preferred catalysts are acids having ionization constants equal to or greater than $1 \times 10^{-2}$ at 25° C. Acids having ionization constants of $2 \times 10^{-4}$ or even lower can be used but they are not as effective. Examples of suitable acids are maleic, p-toluene sulfonic, phosphoric, oxalic, and trichloroacetic acids. The preferred concentrations of these catalysts are from 0.5 or 1% to 10% of the weight of the N-alkoxymethyl polyamide. With weak acids such as sebacic or adipic acid, higher concentrations, higher temperatures of curing, or longer times of curing are used to obtain satisfactory bonding. When the bonding material is to be applied to wood it is preferred that the catalyst impart to the solution a pH of not less than about 3. Examples of salts which are effective as catalysts are ammonium chloride, monosodium phosphate, sodium bisulfate, or others having an acid reaction in aqueous solution. Acid esters such as ethyl acid phosphate can also be used.

The moisture content of wood to be bonded with N-alkoxymethyl polyamides is not critical. Uniformly excellent bond strengths are obtained with wood containing from 3 to 25% moisture. However, when wood of high moisture content, e. g., 25%, is used it is necessary to use a slightly higher concentration of catalyst, or slightly higher curing temperature, or longer curing time than when wood of lower moisture content is used.

The bonding solution can be prepared with any solvents known for the N-alkoxymethyl polyamide. The preferred solvent will depend on the degree of substitution of the polymer and the type of substituent group. Aqueous ethyl alcohol of 70 to 80% concentration has been described in the examples. Other concentrations ranging from 60 to 100% ethyl alcohol can also be used with certain polymers. The ethyl alcohol can be replaced by aqueous methanol, propanol, or butanol as desired. Chloroform-alcohol mixtures can also be used for N-alkoxymethyl polyamides of a high degree of substitution.

The concentration of the bonding solution can be varied within wide limits which depend on the type and viscosity of the N-alkoxymethyl polyamide and the method to be used in applying the adhesive solution. Concentrations ranging from 15 to 40% solids can be used. It is preferred, however, to use a solution of high solids content such as 25 to 35% so that sufficient solids can be applied in one coat to the surfaces to be bonded to yield a solid film of about 7 to 20 lbs. of adhesive per 1000 sq. ft. of glue line.

The amount of solid bonding material necessary to obtain satisfactory bonding of plywood may be varied widely. Uniformly high bond strengths have been obtained with N-methoxymethyl polyhexamethylene adipamide solutions which have been spread at the rate of 7 to 26 lbs. of solid per 1000 sq. ft. of glue line. However, for economical reasons it is preferred to use the smallest amount of the bonding material which will give suitable bond strength. When inert diluents or fillers are also present even smaller amounts of alkoxymethyl polyamide adhesives are effective in forming excellent bond strength.

The N-alkoxymethyl polyamides can be used as the bonding medium in other form than in solution. As described in Example III, a preformed film of polymer may be placed between the contact surfaces of the articles to be bonded. Another method of application is to impregnate paper, regenerated cellulose film, or a fabric with the N-alkoxymethyl polyamide solution, evaporate the solvent, and use the dried, impregnated sheet or fabric in the same manner as a film of the polymer. In this method the paper or fabric may be impregnated with the adhesive solution containing the catalyst or the catalyst can be applied by spraying or other means to the dry impregnated paper or fabric prior to use.

The N-alkoxymethyl polyamide bonding material can be modified by the incorporation of other polymeric materials or various extenders or diluents in varying proportions. For example, walnut shell flour, mica flakes, wood flour, shellac, damar gum, or other similar materials may be incorporated in the bonding solution as extenders or diluents. Examples of other polymeric materials which can be incorporated with the alkoxymethyl polyamide are the following: phenol-formaldehyde resins of various types, certain alkyd resins such as linseed oil modified or castor oil modified, butanol modified ureaformaldehyde resins, mixed glycerides of unsaturated fatty acids and beta-furylacrylic acid, hydrolyzed ethylene/vinyl acetate interpolymers (either partially or completely hydrolyzed), polyvinyl butyral resins, styrene-maleic anhydride resins, terpene-maleic anhydride resins, sulfonamide, formaldehyde resins, bismethoxymethylurea, and rosin-containing materials. These materials can be used in various proportions depending on the compatibility of the particular modifier being used and the properties desired in the final adhesive.

From the foregoing description it will be apparent that laminated products, and particularly molded plywood, of unusual strength can be obtained by the practice of this invention wherein the rate of cure of the bonding agent in the early stages of the heat treatment is sufficiently slow to permit the bonding layer to spread uniformly between the different plies on the mold thereby obtaining uniform contact of the different surfaces, dissipating stresses and strains and that the N-alkoxymethyl bonding agent disclosed herein finally sets up to an infusible polymer which does not possess any thermoplasticity.

As many apparently widely different embodiments of this invention may be made without departing from the spirit and scope thereof, it is to be understood that I do not limit myself to the specific embodiments thereof except as defined in the appended claims.

I claim:

1. A laminated product comprising at least two laminae bonded by a composition comprising a N-alkoxymethyl polyamide, at least one of said laminae consisting of a polymeric organic material having a substantial number of hydrogen atoms attached to elements from groups V and VI of the periodic table, said N-alkoxymethyl polyamide being the reaction product of an alcohol, formaldehyde, and an oxygen-containing acid catalyst with a synthetic linear polyamide which has hydrogen bearing amide groups and which is the reaction product of polyamide forming material selected from the group consisting of (a) monoaminomonocarboxylic acids, (b) mixtures of dibasic carboxylic acid and diamine in equimolecular proportions, and (c) mixtures of dibasic carboxylic acid and monoaminomonohydric alcohol in equimolecular proportions, said N-alkoxymethyl polyamide containing the alkoxymethyl groups

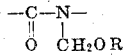

wherein R is the radical of an alcohol, in amount of at least 30% of the amide groups present therein.

2. A laminated product comprising at least two laminae bonded by a composition comprising a N-alkoxymethyl polyamide, said laminae consisting of polymeric organic material having a substantial number of hydrogen atoms attached to elements from groups V and VI of the periodic table, said N-alkoxymethyl polyamide being the reaction product of an alcohol, formaldehyde, and an oxygen-containing acid catalyst with a synthetic linear polyamide which has hydrogen bearing amide groups and which is the reaction product of polyamide forming material selected from the group consisting of (a) monoaminomonocarboxylic acids, (b) mixtures of dibasic carboxylic acid and diamine in equimolecular proportions, and (c) mixtures of dibasic carboxylic acid and monoaminomonohydric alcohol in equimolecular proportions, said N-alkoxymethyl polyamide containing the alkoxymethyl groups

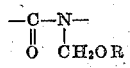

wherein R is the radical of an alcohol, in amount of at least 30% of the amide groups present therein.

3. A laminated product comprising at least two cellulosic laminae bonded by a composition comprising a N-alkoxymethyl polyamide, said N-alkoxymethyl polyamide being the reaction product of an alcohol, formaldehyde, and an oxygen-containing acid catalyst with a synthetic linear polyamide which has hydrogen bearing amide groups and which is the reaction product of polyamide forming material selected from the group consisting of (a) monoaminomonocarboxylic acids, (b) mixtures of dibasic carboxylic acid and diamine in equimolecular proportions, and (c) mixtures of dibasic carboxylic acid and monoaminomonohydric alcohol in equimolecular proportions, said N-alkoxymethyl polyamide containing the alkoxymethyl groups

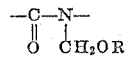

wherein R is the radical of an alcohol, in amount of at least 30% of the amide groups present therein.

4. Laminated plywood the laminae of which are bonded by a composition comprising a N-alkoxymethyl polyamide, said N-alkoxymethyl polyamide being the reaction product of an alcohol, formaldehyde, and an oxygen-containing acid catalyst with a synthetic linear polyamide which has hydrogen bearing amide groups and which is the reaction product of polyamide forming material selected from the group consisting of (a) monoaminomonocarboxylic acids, (b) mixtures of dibasic carboxylic acid and diamine in equimolecular proportions, and (c) mixtures of dibasic carboxylic acid and monoaminomonohydric alcohol in equimolecular proportions, said N-alkoxymethyl polyamide containing the alkoxymethyl groups

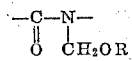

wherein R is the radical of an alcohol, in amount of at least 30% of the amide groups present therein.

5. Laminated plywood which is in the form of a compound curve and in which the laminae are bonded by a composition comprising a N-alkoxymethyl polyamide, said N-alkoxymethyl polyamide being the reaction product of an alcohol, formaldehyde, and an oxygen-containing acid catalyst with a synthetic linear polyamide which has hydrogen bearing amide groups and which is the reaction product of polyamide forming material selected from the group consisting of (a) monoaminomonocarboxylic acids, (b) mixtures of dibasic carboxylic acid and diamine in equimolecular proportions, and (c) mixtures of dibasic carboxylic acid and monoaminomonohydric alcohol in equimolecular proportions, said N-alkoxymethyl polyamide containing the alkoxymethyl groups

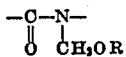

wherein R is the radical of an alcohol, in amount of at least 30% of the amide groups present therein.

6. The laminated product set forth in claim 1 in which said polyamide is N-alkoxymethyl polyhexamethylene adipamide.

7. The laminated product set forth in claim 3 in which said polyamide is N-alkoxymethyl polyhexamethylene adipamide.

8. The laminated product set forth in claim 1 in which said polyamide is N-methoxymethyl polyhexamethylene adipamide.

9. The laminated product set forth in claim 4 in which said polyamide is N-methoxymethyl polyhexamethylene adipamide.

FRED W. HOOVER.

REFERENCES CITED

The following references are of record in the file of this patent:

UNITED STATES PATENTS

| Number | Name | Date |
|---|---|---|
| 1,628,886 | Jackson et al. | May 17, 1927 |
| 2,015,806 | Menger et al. | Oct. 1, 1935 |
| 2,019,834 | Vierling et al. | Nov. 5, 1935 |
| 2,071,250 | Carothers | Feb. 16, 1937 |
| 2,244,184 | Austin et al. | June 3, 1941 |